United States Patent [19]

Shyu

[11] 4,251,088
[45] Feb. 17, 1981

[54] HYDRAULIC SUSPENSION SYSTEM FOR CAR

[76] Inventor: Bor L. Shyu, No. 208, Ching Feng Village, Jyi An Shiang, Huea Lian Shiann, Taiwan

[21] Appl. No.: 972,898

[22] Filed: Dec. 26, 1978

[51] Int. Cl.³ .............................................. B62D 9/02
[52] U.S. Cl. ............................................... 280/112 A
[58] Field of Search ............... 280/672, 112 A, 678, 280/698, 702–714, 689, 683

[56] References Cited

U.S. PATENT DOCUMENTS

| | | | |
|---|---|---|---|
| 2,341,726 | 2/1944 | Kolbe | 280/112 A |
| 2,474,471 | 6/1949 | Dolan | 280/112 A X |
| 3,083,983 | 4/1963 | Wettstein | 280/702 |
| 3,399,905 | 9/1968 | Vogel | 280/702 |
| 3,563,566 | 2/1971 | Weber | 280/702 |
| 3,820,809 | 6/1974 | Blonar | 280/112 A X |

Primary Examiner—John J. Love
Assistant Examiner—Norman L. Stack
Attorney, Agent, or Firm—Cushman, Darby & Cushman

[57] ABSTRACT

A suspension system for a car utilizing hydraulic cylinder units on each wheel connected by fluid hoses in order to shift the stiffness of their shock absorbing effect depending on the turning radius and speed of the vehicle in order to prevent the car from flipping over during high speed turn arounds.

8 Claims, 3 Drawing Figures

HYDRAULIC SUSPENSION SYSTEM FOR CAR

BACKGROUND OF THE INVENTION

It has been observed from stability test of cars, that cars turn over when turning around if the velocity, $\overline{V}$ is greater than N(gdr/h), wherein, $\overline{V}$ is the velocity of the car in turning around g is the gravity of earth d is half of the distance from a left wheel to a right wheel at either the front or the rear of the car r is the radius of the car's turning circle h is the altitude of the center of gravity of the car in turning around.

The velocity of the car in turning arond $\overline{V}$, depends on d, r and h. If r & h are constant, a relatively larger value of a d permits $\overline{V}$ to have a larger value; but if d is constant, a larger value of h or a larger value of $\overline{V}$ causes the car to easily turn over. Therefore, d and h are very important factors to a car's stability which should be considered when the car is designed.

Theoretically, a turning object always withstands the tendency by its center line of gravity to cross its grounded point perpendicular to the earth. When a car turns around, its outer wheels are pushed downward so that the car will turn over if all those factors suit the equation $\overline{V} > N(gdr/h)$.

Conventional suspension systems of cars feature respectively one hard type and one soft type. The hard type has as one of its advantages to resist the tendency of the car to turnover but provides little comfort to the travellers (riders). On the other hand, the soft type of suspension system provides a comfortable feeling to the travellers but increases the possibility of the car being turned over.

The main object of this invention is to provide a comfortable car while also improving its suspension system so it can resist to a greater extent that its original design the tendency of the car to turnover in turning around.

SUMMARY OF THE INVENTION

The present invention seeks to overcome the disadvantages described above and provide greater comfort and security to travellers (riders). A separate circulatively kink-looped hydraulic cylinder unit pair is separately mounted on opposite wheels of each row of wheels (the front row of wheels and the rear row of wheels) as shock absorbers. Each hydraulic cylinder pair features two cylinder units, one for each wheel, each with one main cylinder and one sub-cylinder, each main cylinder having one hose connected from its top to the sub-cylinder of the opposite cylinder unit to form a circulative hydraulic system performing a shock-absorbing function when the cylinder units are secured to a car (with their cylinder bottoms mounted to the car base-frame and their piston rods to the car body). In the present invention hydraulic system, moreover each cylinder unit has an associated interrupter employed in the hose which acts as a switching device for controlling liquid circulation of the hydraulic system. These interrupters are connected to an operated by the steering system of the car. When the car turns around to the left (right) the steering system shuts down the interrupter on one side and causes the right (left) side cylinders to be less elastic and therefore makes the left (right) side of the car to be difficult to be lifted, thus provides relatively greater stability to the car in high-speed turning.

Other objects and functional and structural features will be apparent from the following description taken with the accompanying drawings.

DETAILED DESCRIPTION OF THE INVENTION

Figure 1:
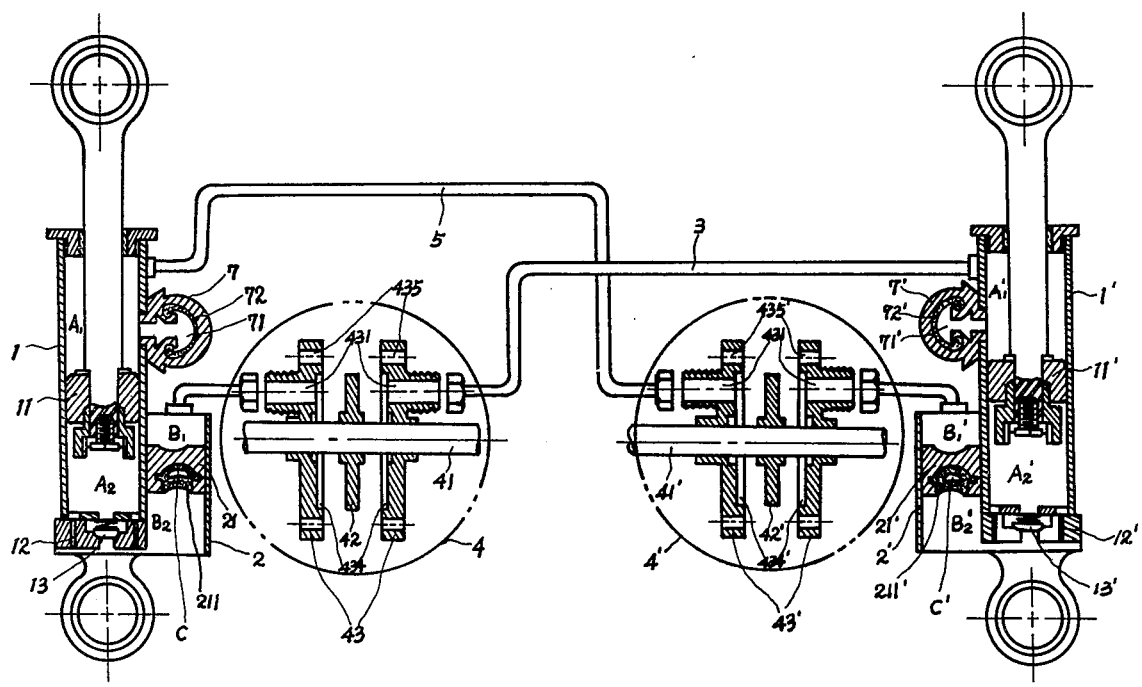
FIG. 1 is a cross sectional view of one of the present invention hydraulic cylinder pairs.

On FIG. 1, two cylinder units are separately suspended on the right-wheel and left wheel of the front (or rear) part of a car with circulation hoses connected from top chambers $A_1$ & $A_1'$ of main cylinders 1 and 1' to top chambers $B_1'$ & $B_1$ of sub-cylinders 2' and 2 respectively to form a circulatively kink-looped cylinder pair. Two of these cylinder pairs along with conventional springs on both rows of wheels (front & rear wheels) of a car form a whole suspension system of the car. When the car runs on an undulation surface and shocks the car itself, the pistons 11 & 11' will be forced inwardly and resiled outwardly to absorb car shock. In the piston inward travel, pressure might be exerted successively through liquid in chambers $A_2$ (or $A_2'$), $B_2$ (or $B_2'$), $B_1$ (or $B_1'$) and hose 3 (or 5), and then through liquid in chamber $A_1'$ (or $A_1$) of another cylinder 1' or (1) to cause an unified circulation of the contained liquid. Pressure is also the same backwardly for the outward travel of the pistons 11 and 11'. When the liquid is inward flowing, liquid in chamber $A_2$ (or $A_2'$) flows through channel 12 (or 12') to chamber $B_2$ (or $B_2'$) and lifts driven piston 21 (or 21') outward. When liquid impacts the driven piston 21 (or 21'), an air-cushion C (or C') inside driven piston 21 (or 21') acts as a buffer absorbing a certain portion of the car shock. When liquid is outward flowing, liquid from chamber $B_1$ (or $B_1'$) presses driven piston 21 (or 21') inwardly forcing liquid in chamber $B_2$ (or $B_2'$) to flow to open check valve 13 (or 13') and into chamber $A_2$ (or $A_2'$) to lift piston 11 (or 11'). At this time check valve 13 (or 13') acts as a buffer absorbing a certain portion of the car shock. If these two liquid flowings take place at the same time separately from cylinder 1 and cylinder 1' (as for example, while one row of wheels crosses a pothole) or if the liquid flowing is blocked by the functioning of one of the interrupters 4 or 4' (while the car is turning around), both driven pistons 21 and 21' will not travel and air-cushion C and/or C' and check valve 13 and/or 13' perform most of the shock absorbing function for the car.

Figure 3:
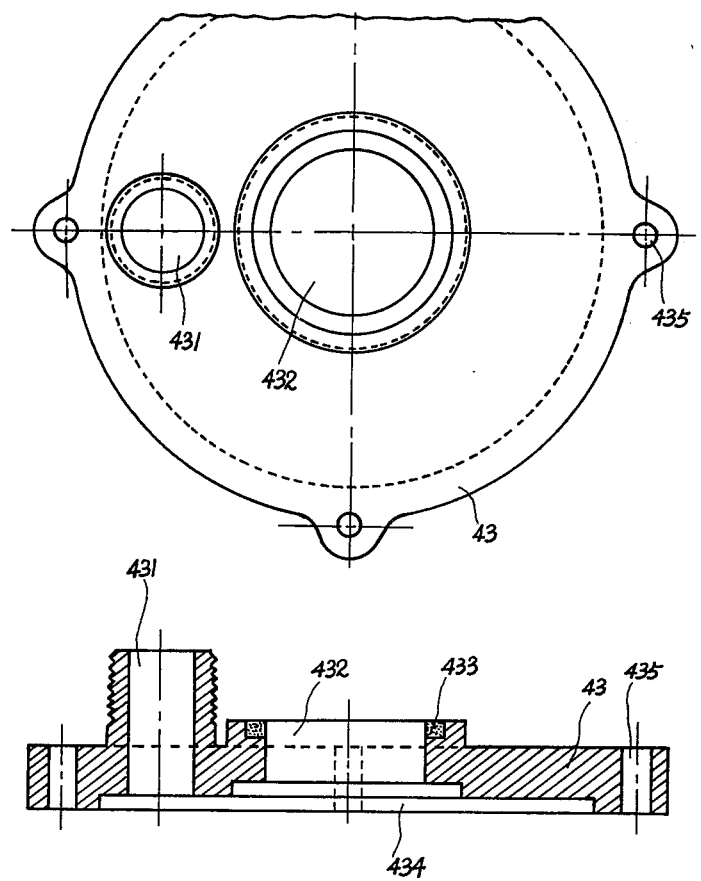
FIG. 3 shows views of the present invention interrupter and its liquid flow controller.
Figure 3:
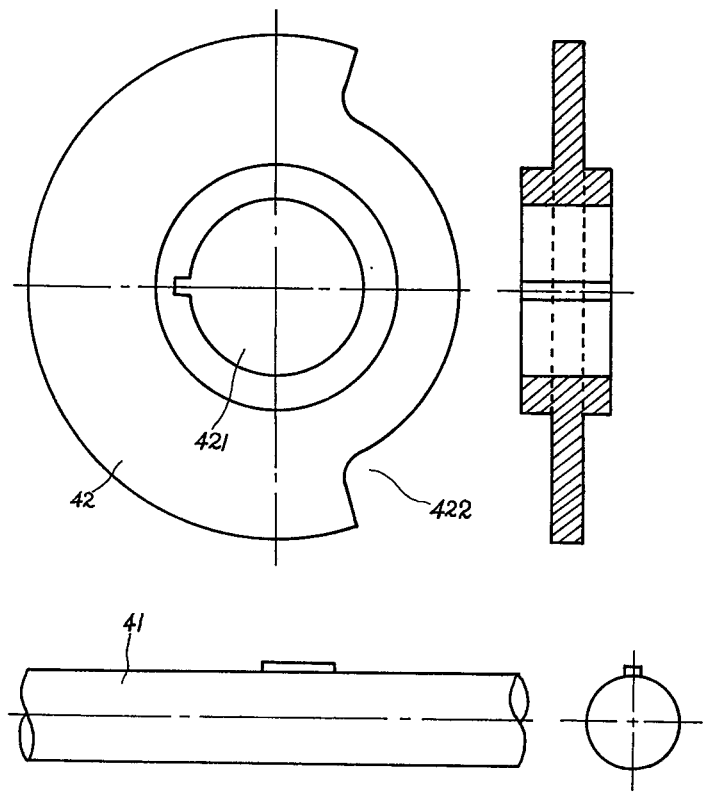

On FIG. 3, the present invention interrupter is shown comprising one main body 43, one plate controller 42 and one shaft 41. One liquid channel 431 is bored in main body 43 and one shaft hole 432 is bored in the center of the main body 43, for placing shaft 41 through them. Packing 433 is sealed around the fitting hole 432 for preventing possible liquid leakage. On the opposite side of one-half of main body 43, there is one indented round portion 434 for receiving the plate controller 42. Plate controller 42 is a round plate except one vacant portion 422. When plate controller 42 is in a first angle of rotation, vacant portion 422 permits liquid to flow through liquid channel 431, but when plate controller 42 is turned to a second angle of rotation, the vacant plate controller 42 covers liquid channel 431 and therefore liquid flow is blocked. One shaft fitting hole 421 is in the center of the plate controller 42 for fitting the shaft 41 and to enable plate controller 42 to be turned together with the shaft. The two halves of main body 43 are screwed together for keeping plate controller 42 secure.

Figure 2:
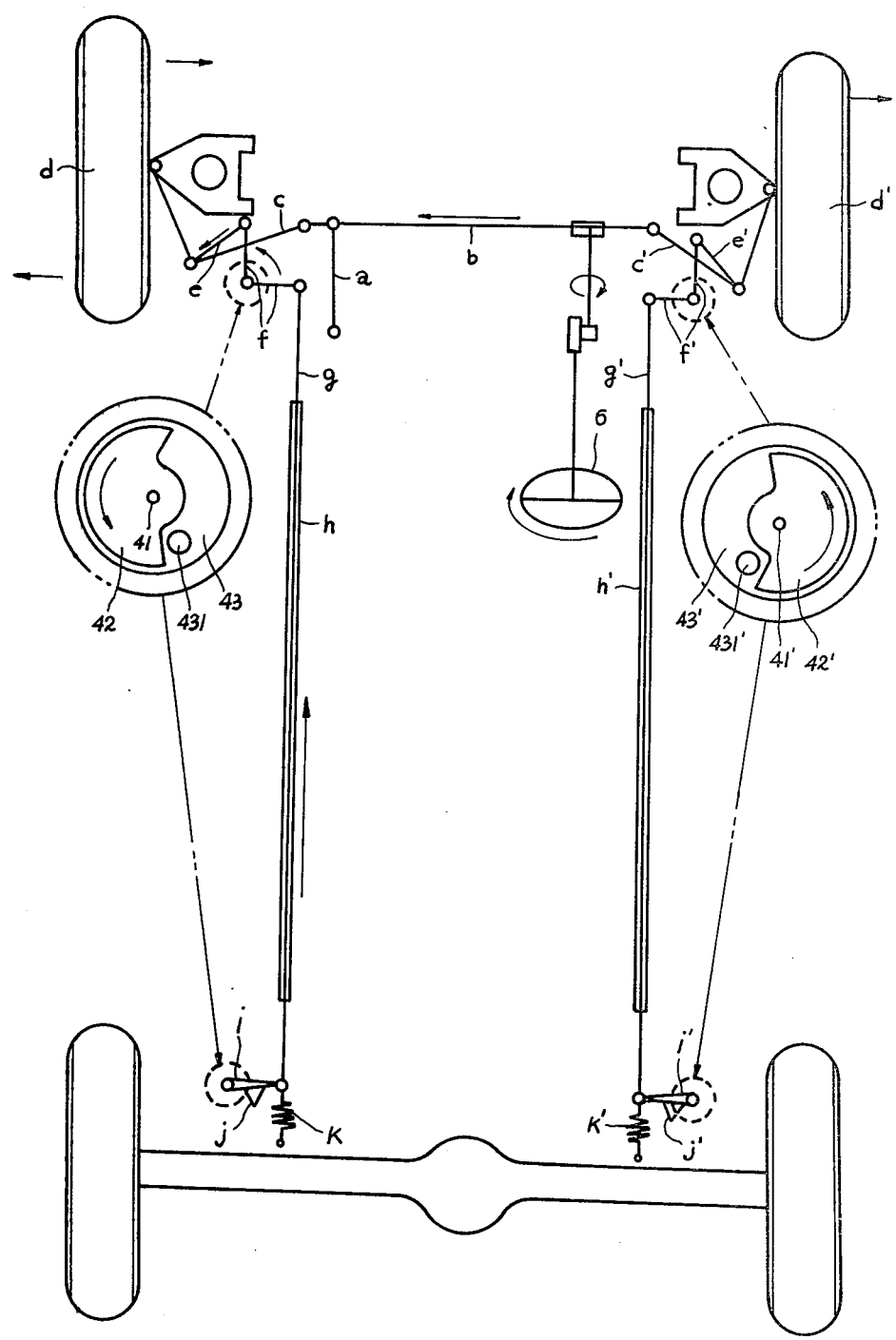
FIG. 2 is a scheme showing the present invention interrupters in relation to the car steering system.

FIG. 2 is a configuration of the present invention interrupter shown in relation to the steering system of a car. For instance, when steering wheel 6 turns right, mid rod a and transmission rod b, move left, connecting rod C turns the left wheel d and rod C' pulls the right wheel d', together turning the wheels to the right. At the same time "L"-shape rod f and reversed "L" (⌐)-shape rod f' are turned counterclockwise. The shafts 41 & 41' are fitted respectively to the bent corner of rods f and f' as fulcrum points of the rods f & f', and liquid channels 431 & 431' are placed in relation to plate controller 42 & 42' in such a way that when both shafts 41 and 41' turn in one direction, plate controller 42 and 42' can only shut one of liquid channel 431 and 431', as FIG. 2 shows. Therefore, when the car turns right, the left interrupter 4 is closed so that the outer circle side of the car when it is turning has less vertical elasticity and makes lifting the car about its outer side (left side) much more difficult. But the right cylinder still has elasticity to enable the inner side (right side) of the car to rise on the road to complete the car turning around to right. During such turning to the right a semi-spherical rubber 72', on FIG. 1, in liquid spare chamber 7' on the upper wall of main cylinder 1' fills with liquid to supply chamber $A_1'$ to enable piston 11 to travel down. Rods f and f' also draw respectively wires g and g' to turn rods i and i' and therefore turn the plate controllers 42 and 42' of the rear interrupters to synchronously control the liquid flow of the rear hydraulic cylinder pair. Springs k & k' respectively draw wires g & g' for resetting all the plate controllers in position when the car is driving straight. Stoppers j & j' hold the rods i & i' and wires g & g' back but not excessively.

What is claimed is:

1. A hydraulic suspension system for improving the stability and shock absorbing capacity of a vehicle during high speed turning on a supporting surface, the vehicle having a plurality of supporting wheels including a left and a right wheel, at least one of said plurality of supporting wheels being turnable for turning the vehicle, the vehicle having a conventional spring suspension system which includes springs on opposite sides thereof mounted between said left and right vehicle wheels and the vehicle body, said hydraulic system comprising:

left and right cylinder units, respectively fixed between said body and said left and right wheels, each unit including a primary cylinder and a primary piston reciprocally sealingly movable in a first direction and a second direction in said primary cylinder, said primary piston separating said cylinder into a first chamber and a second chamber, said piston having opposing first and second surfaces respectively facing in said first and second directions;

first conduit means, responsive to left movement of said primary piston, for guiding therethrough fluid between said left cylinder unit second chamber and said right cylinder unit first chamber; and second conduit means, responsive to movement of said right primary piston, for guiding therethrough fluid between said right cylinder unit second chamber and said left cylinder unit second chamber so that when left and right cylinder unit primary pistons are both moving in said second direction fluid in said left second primary chamber flows toward said right first chamber and fluid in said right second primary chamber flows toward said left first primary chamber; and interrupter means, responsive to turning of said at least one turnable wheel, for blocking fluid flow through said second conduit means when said at least one turnable wheel turns to the left so as to prevent said left primary piston from moving in said second direction, and for blocking fluid flow through said first conduit means when said at least one turnable wheel turns to the right so as to prevent said right primary piston from moving in said second direction, fluid flow through only one of said first and second conduit means being blocked at one time, thereby preventing upward motion of said vehicle body and the one of said left and right wheels on the side of said vehicle toward which said at least one turnable wheel is turned.

2. A hydraulic system as in claim 1 wherein said first conduit means comprises:

right receiving means, coupled to said second right primary chamber when said right primary piston is forced in said second direction and fluid flow in said first conduit means is blocked by said interrupter means, so as to absorb shocks to said right wheel when said vehicle is turning left; and said second conduit means comprises left receiving means, coupled to said left second main chamber for resistably receiving fluid in said left second primary chamber when said left primary piston is forced in said second direction and fluid flow in said second conduit means is blocked by said interrupter means, so as to absorb shocks to said left wheel when said vehicle is turning right.

3. A hydraulic system as in claim 2 further comprising:

two storage means, respectively coupled to said right and left first primary chambers for alternatively supplying additional fluid thereto when the primary piston which is movable therein is forced in said second direction and fluid flow in the one of said conduit means coupled thereto is blocked by said interrupter means.

4. A hydraulic system as in claim 2 or claim 3 wherein said right and left resistably receiving means each comprises a secondary cylinder and a secondary piston, said secondary piston being sealingly reciprocally movable in said second secondary cylinder, said secondary piston separating said secondary cylinder into a first and a second secondary chamber, said second secondary chamber communicating with said second primary chamber, said secondary piston having a cushion formed on one side thereof.

5. A hydraulic suspension system as in claim 4 wherein each said primary cylinder comprises a check valve means, separating said second primary chamber from said second secondary chamber, for limiting fluid flow from said second primary chamber into said second secondary chamber while buffering fluid flow into said second primary chamber from said second secondary chamber, a narrow open passage being formed between said second secondary chamber and said second primary chamber parallel to said check valve means for guiding fluid between said second secondary chamber and said second primary chamber.

6. A hydraulic suspension system as in claim 3 wherein said right and left storage means each comprise a housing defining a respective supply chamber opening into said first primary chamber and a corresponding elastic sack formed in said chamber so as to contract and thereby supply fluid to said first primary chamber when the primary piston which is movable therein is forced in said second direction and fluid flow in the conduit means coupled to said first primary chamber is blocked, the peripheral surface of said supply chamber limiting the expansion of said elastic sack.

7. A hydraulic suspension system as in claim 1 wherein each of said interrupter means comprises two interrupters; each interrupter including;
 an interrupter body, said interrupter body having a liquid channel bored therethrough;
 a substantially round plate shaped controller having an axis of rotation and a vacant portion along a given degree of arc thereof axially rotatably attached to said interrupter body such that said controller including said vacant portion is rotatable across said channel, said vacant portion being rotatable out of said channel, such that said controller does not block said channel when said controller vacant portion is disposed in said channel and blocks said channel when said vacant portion is not disposed in said channel; and
 shaft means, passing through said interrupter body and mounted to said controller along said axis of rotation, for rotating said controller said conduit means respectively coupling opposite ends of said channel to said first and second main cylinders so as to guide fluid moving therebetween through said channel.

8. A hydraulic suspension system as in claim 7 wherein said interrupters are arranged in relation to the steering system of said car, said shaft means being axially rotatable in response to said steering system.

* * * * *